US006394333B1

(12) United States Patent
Zachman et al.

(10) Patent No.: US 6,394,333 B1
(45) Date of Patent: May 28, 2002

(54) FLAG INSERTION TOOL

(76) Inventors: Stan Zachman, 10901 SW. Fox Brown Rd., Indiantown, FL (US) 34956; Sean J. Cribb, 2004 SW. 35th Ave., Delray Beach, FL (US) 33445

( * ) Notice: Subject to any disclaimer, the term of this patent is extended or adjusted under 35 U.S.C. 154(b) by 0 days.

(21) Appl. No.: 09/448,379

(22) Filed: Nov. 23, 1999

Related U.S. Application Data

(62) Division of application No. 09/116,674, filed on Jul. 16, 1998, now Pat. No. 5,988,296.

(51) Int. Cl.[7] .................................................. B25D 1/16
(52) U.S. Cl. .......................... 227/147; 227/156; 173/90
(58) Field of Search ................................ 227/147, 156; 173/90, 91

(56) References Cited

U.S. PATENT DOCUMENTS

| | | | | | |
|---|---|---|---|---|---|
| 337,061 | A | * | 3/1886 | Higgins et al. | 227/147 |
| 350,420 | A | * | 10/1886 | Dillon | 227/147 |
| 746,549 | A | * | 12/1903 | Modlin et al. | 227/147 |
| 2,300,813 | A | * | 11/1942 | Savage | 173/90 |
| 2,934,984 | A | * | 5/1960 | Woodman | 173/91 |
| 4,624,323 | A | * | 11/1986 | Burrolla | 173/90 |
| 5,123,584 | A | * | 6/1992 | Harrison | 227/147 |
| 5,474,554 | A | * | 12/1995 | Ku | 227/147 |

* cited by examiner

*Primary Examiner*—Scott A. Smith
(74) *Attorney, Agent, or Firm*—Glenn E. Gold

(57) ABSTRACT

A portable hand tool (10) is provided for inserting a marker flag into the ground. The tool has a shaft (12) having a handle (30) attached at a first end, and a ground-penetrating tip (14) extending from a second end. The ground-penetrating tip has an aperture (16) extending longitudinally through the shaft and shaped and sized for receiving the stem portion of the marker flag. In operation, a portion (42) of the end of the flag stem is inserted in the aperture and bent back toward the tool shaft to form U-shaped bend (44) in the flag stem. Following insertion into the ground, the bend acts as a barb to anchor the flag stem in the ground.

6 Claims, 2 Drawing Sheets

FLAG INSERTION TOOL

CROSS-REFERENCE TO RELATED APPLICATION

This application is a divisional of application Ser. No. 09/116,674, filed Jul. 16, 1998, now U.S. Pat. No. 5,988,296.

FIELD OF INVENTION

This invention relates generally to hand tools, and more particularly to a portable hand tool for securing a marker flag into the ground.

BACKGROUND OF THE INVENTION

Many types of workers use flag markers, or marker flags, for identifying the location of objects buried beneath the ground. For instance, surveyors, cable television workers and utility company workers commonly use flag markers to locate wires, cables and various other objects and structures in a variety of terrains. Regardless of the application, it is generally desirable to minimize the time and effort required for flag insertion, while maintaining adequate anchoring of the flag stem in the ground. Often, an insertion tool is required to implant the flag stems into the ground.

Historically, the use of cumbersome and heavy flag insert tools have contributed to the time and effort required to insert such marker flags into the ground. More recently, there has been a recognized need for a more lightweight, portable marker flag insertion tool. One such tool is disclosed in U.S. Pat. No. 5,671,814 to Smith. As illustrated in FIG. 1, Smith discloses a multiple component flag insert tool including an inner rod, an outer rod, and a pair of collars. The inner rod has a V-shaped notch at one end. The collars are welded to the inner rod. The outer rod is slidably mounted between the collars. In operation, Smith's insertion tool requires the user to initially insert the flag stem through an aperture in the inner rod to form an L-shaped bend at the end of the stem. Subsequently, the flag stem is removed from the aperture and the horizontal length of the flag stem is positioned on the ground beneath the V-shaped notch. Driving the flag stem into the ground requires the repeated raising and lowering of the outer rod to exert a pounding force against the lower collar.

Although Smith's insertion tool provides a number of advantages over those historically used, it leaves much room for improvement. In particular, the relatively large surface area of the V-shaped insertion end of the tool provides an ineffective surface for penetrating the ground, resulting in the need for the repeated pounding force of the outer rod against the lower collar to drive the flag stem into the ground. In use, Smith's insertion tool requires a multi-step flag insertion method which contributes to its inefficiency. Furthermore, the multi-component construction of the tool contributes to increased tool manufacturing time and cost.

For the foregoing reasons, there is an established need for an improved portable flag insertion tool which provides a more effective and more efficient means for marker flag insertion. It would be desirable to provide such a tool having a minimal number of individual components such that the tool can be manufactured in a more time- and cost-effective manner.

SUMMARY OF THE INVENTION

It is an object of this invention to provide an improved lightweight, portable marker flag insertion tool for effectively inserting and anchoring marker flags in the ground.

It is an other object of this invention to provide an improved marker flag insertion tool having an insertion end designed for facilitating penetration of the tool into the ground.

It is yet another object of this invention to provide a marker flag insertion tool which, in operation, minimizes the number of steps required to insert a marker flag into the ground.

It is a further object of this invention to provide a marker flag insertion tool having a minimal number of components capable of being manufactured efficiently and cost-effectively.

An improved marker flag insertion tool comprises a rod having a shaft and first and second ends. A handle attached at the first end provides a first surface for gripping the tool and a second surface for receiving a force imparted by a second tool, such as a hammer, for driving the second end of the insertion tool into the ground. A ground-penetrating tip formed at the second end of the rod has an annular surface adapted for cutting or burrowing into the ground. The annular surface has a rounded notch formed therein for containing the flag stem while the stem is bent and driven into the ground. The tip has an aperture extending longitudinally through the rod shaft along a central axis thereof. In an alternate embodiment of the present invention, the second end of the rod terminates at a sharpened edge for providing improved ground penetration.

In operation, a marker flag is inserted into the ground with the tool as follows: (1) a length of the marker flag stem is inserted into the rod shaft through the aperture; (2) the remaining length of the flag stem is bent back toward the rod such that the flag stem engages and is contained by the rounded notch formed in the rod tip; (3) the ground-penetrating tip is driven into the ground such that a length of the first end of the flag stem is deformed into a hook shape; and (4) the rod shaft is withdrawn from the ground. Upon withdrawing the rod shaft from the ground, the hook-shaped end of the flag stem anchors the marker flag in the ground.

DETAILED DESCRIPTION OF PREFERRED EMBODIMENTS

Figure 1:
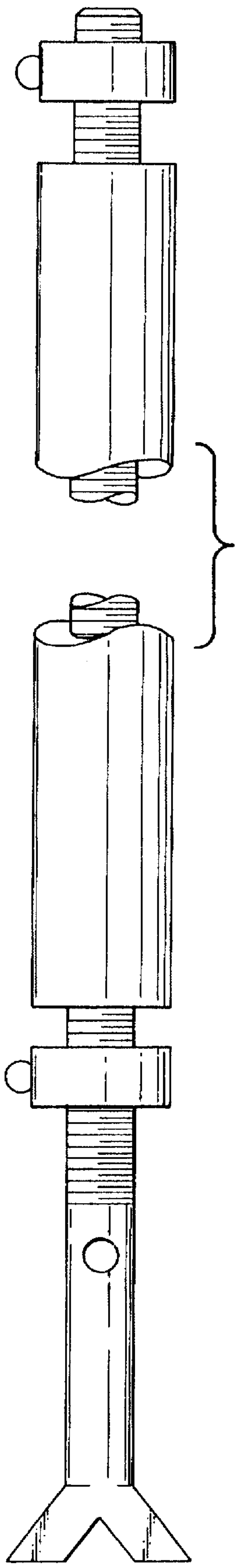
FIG. 1 (PRIOR ART)
FIG. 1 is a marker flag insertion tool in accordance with the prior art.

While the specification concludes with claims defining the features of the invention that are regarded as novel, it is believed that the invention will be better understood from a consideration of the following description in conjunction with the drawing figures.

Figure 2:
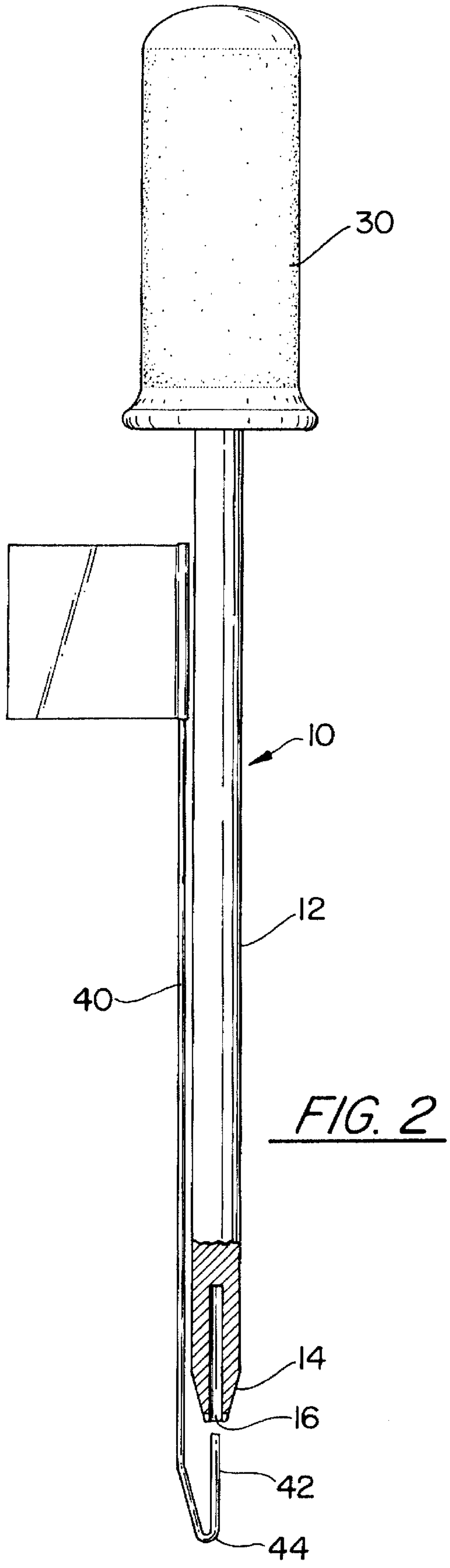
FIG. 2 is a side view, partially in cross-section, of an insertion tool in accordance with a preferred embodiment of the present invention.
Figure 3:
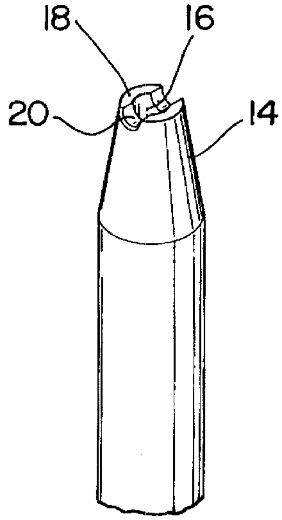
FIG. 3 is a perspective view of a marker flag insertion tool tip in accordance with a preferred embodiment of the present invention.

Referring now to FIGS. 2–3, the portable marker flag insertion tool of the present invention includes a rod 10 having a shaft 12 and a ground penetrating tip 14. Preferably, ground-penetrating tip 14 is formed as an integral portion of the shaft 12. In particular, it is preferred that the ground-penetrating tip is formed by machining the end of a solid metal rod. Alternatively, the rod can be manufactured from a non-metallic material. For instance, the rod can be molded from a plastic material. Regardless of the material used, the rod should be sufficiently rigid to withstand insertion into the ground with minimal bending of the rod. Although the preferred embodiment of the present invention incorporates a unitary shaft/tip structure, it will be appreciated by those skilled in the art that removable ground-penetrating tips incorporating the preferred novel tip structure could be implemented without departing from the spirit and scope of the invention. For instance, removable tips can be formed with a threaded portion for being screwed onto the shaft. A handle 30 attached at an end of the shaft opposite the ground-penetrating tip provides a surface for gripping the tool. Where hard terrain is encountered, the top of the handle can be used for imparting a driving force to the tool, for example, with a hammer.

Preferably, shaft 12 tapers radially inward to form the ground-penetrating tip 14. An aperture 16 in the tip extends longitudinally in a direction away from the tip and along a central axis of shaft 12. Aperture 16 is shaped and sized for snugly receiving a length 42 of a marker flag stem 40. In the preferred embodiment of the invention, ground-penetrating tip 14 terminates at an annular-shaped surface 18 which surrounds aperture 16. At least one U-shaped notch 20 is formed in surface 18 for engaging and containing the marker flag stem during insertion of the marker flag into the ground. In contrast to known portable insertion tools, such as the prior art tool depicted in FIG. 1, the present invention is provided with a notch 20 having a smooth surface profile for minimizing the potential for flag stem shearing during insertion of the marker flag into the ground.

Figure 4:
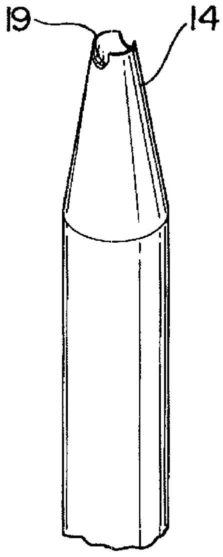
FIG. 4 is a perspective view of a marker flag insertion tool tip in accordance with an alternate embodiment of the present invention.

Referring now to FIG. 4, in an alternate embodiment of the present invention, ground-penetrating tip 14 terminates at an edge 19. The edge may be sharpened to provide improved penetration of tip 14 into the ground, especially for marker flag insertion into hard or rocky terrain.

In operation, a first length 42 of flag stem 40 is inserted into aperture 16. Flag stem 40 is then bent such that the flag stem frictionally engages, and is contained by, the notch 20. Preferably, the flag stem is bent over notch 20 until the remaining length of the flag stem is positioned adjacent to, and substantially parallel to, rod 10 to form a substantially U-shaped bend in the end of the flag stem. Alternatively, marker flags can be provided with preformed bends. In the latter instance, the step of bending the flag stem would not be required. Although the preferred marker flag insertion method includes forming a U-shaped bend in stem 40 prior to driving tip 14 into the ground, this is not necessary. For instance, flag stem 40 can be bent into an L-shape, such that the exposed, or remaining length of stem 40 lies approximately adjacent the ground surface prior to the step of driving the tool tip into the ground. In that case, a U-shape, or hook, is formed at the end of the flag stem during the subsequent step of driving the tip into the ground.

Following flag stem insertion into the tool, the ground-penetrating tip 14 is driven into the ground. For instance, the flag stem 40 and tool shaft 12 can be simultaneously gripped and driven into the ground by hand where soft terrain is encountered. Where harder terrain is encountered, a second instrument, such as a hammer, can be used to impart a driving force upon the handle 30 to drive ground-penetrating tip 14 into the ground. Upon reaching the desired depth of penetration, the tool is withdrawn from the ground, leaving the marker flag behind. The hook-shaped bend 44 in marker flag stem 40 effectively anchors the marker flag in the ground.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims. For instance, it will occur to those skilled in the art that the tool of the present invention has myriad applications, and is not limited to use with marker flags. The tool can be used to insert a vast array of objects, or work pieces, into the ground. Furthermore, modifications to the tool structure are possible while maintaining the intended functionality of the tool. For instance, the illustration of the shaft 12 having a cylindrical shape, or the ground-penetrating tip 14 having a smooth outer surface is not intended to be so limiting. For example, it will occur to one having ordinary skill in the art that the shaft and tip could have non-smooth outer surfaces comprising multiple planar sides. Furthermore, portions of the tip surface 18 or edge 19 could extend outwardly to form a leading edge portion of the tip to further protect the flag stem from severing during insertion into the ground.

What is claimed is:

1. A portable tool for inserting a marker flag having a flag stem into the ground, comprising:

a rod member having first and second ends, a first length of said rod member extending from the first end toward the second end having a uniform diameter, a second length of said rod member extending from said first length at said uniform diameter toward the second end and having a continuous inwardly tapering surface forming a ground-penetrating tip portion proximate said second end;

said ground-penetrating tip portion having a leading surface surrounding an aperture, the leading surface including an integral notch having an adequate depth for containing said flag stem during insertion of said marker flag into the ground, the aperture extending toward the first end of said rod member along a central axis thereof to form a channel, the channel having a substantially uniform diameter and dimensioned for snugly receiving a substantially straight length of said flag stem;

said channel having a length substantially greater than the depth of said integral notch; and a handle attached to the first end of said rod member.

2. A portable tool as recited in claim 1, wherein the leading surface of said ground-penetrating tip comprises an annular-shaped tip surface.

3. A portable tool as recited in claim 1, wherein said notch has a smooth surface profile for preventing said flag stem from shearing during insertion of said marker flag into the ground.

4. A portable tool as recited in claim 1, wherein the leading surface of said ground-penetrating tip comprises an edge.

5. A portable tool as recited in claim 1, wherein the length of said channel is at least 10 times greater than the depth of said notch.

6. A portable tool as recited in claim 1, wherein the length of said channel is greater than the length of said ground-penetrating tip portion.

* * * * *